US012607746B2

(12) United States Patent　　(10) Patent No.: US 12,607,746 B2
Uetsuka　　(45) Date of Patent: Apr. 21, 2026

(54) DISTANCE AND SPEED MEASURING APPARATUS

(71) Applicant: STERAVISION CO, LTD., Ibaraki (JP)

(72) Inventor: Hisato Uetsuka, Ibaraki (JP)

(73) Assignee: STERA VISION CO., LTD., Ibaraki (JP)

( * ) Notice: Subject to any disclaimer, the term of this patent is extended or adjusted under 35 U.S.C. 154(b) by 1123 days.

(21) Appl. No.: 17/755,378

(22) PCT Filed: Jul. 21, 2020

(86) PCT No.: PCT/JP2020/028308

§ 371 (c)(1),
(2) Date: Apr. 27, 2022

(87) PCT Pub. No.: WO2021/020242

PCT Pub. Date: Feb. 4, 2021

(65) Prior Publication Data

US 2022/0404498 A1　　Dec. 22, 2022

(30) Foreign Application Priority Data

Jul. 26, 2019　(JP) ................................ 2019-138295

(51) Int. Cl.
G01S 17/58 (2006.01)
G01S 7/48 (2006.01)
(Continued)

(52) U.S. Cl.
CPC ............ G01S 17/58 (2013.01); G01S 7/4808 (2013.01); G01S 7/4916 (2013.01); G01S 17/34 (2020.01)

(58) Field of Classification Search
None
See application file for complete search history.

(56) References Cited

U.S. PATENT DOCUMENTS 6,388,739 B1 * 5/2002 Rice ...................... G01S 17/003
356/477
7,986,397 B1 7/2011 Tiemann et al.
(Continued)

FOREIGN PATENT DOCUMENTS

JP　　2001-324563 A　11/2001
JP　　2012-502301 A　1/2012
(Continued)

*Primary Examiner* — Eric L Bolda
(74) *Attorney, Agent, or Firm* — Taro Yaguchi

(57) ABSTRACT

To provide a distance and velocity measurement apparatus that can be adopted preferably in a LiDAR or a sensor for a robot, wherein the apparatus can prevent deterioration of SN ratio even in a case where an object in an external environment vibrates. A LiDAR 20 according to the present embodiment includes a first laser apparatus 1a, a second laser apparatus 1b, a polarization-maintaining type optical fiber 2, a WDM filter 6, an optical fiber coupler 3a, an optical amplifier 11, an input/output unit 4, an optical scanner 5, a second optical fiber coupler 3b, a balanced photodetector 7, and a square-law detector 9. Further, a delay line 10 composed of a polarization-maintaining optical fiber is provided on the local port 2b. The first laser apparatus 1a includes a device for generating a first laser light having a first wavelength and a first chirp rate in an interior thereof, and the second laser apparatus 1b includes a device for generating a second laser light having a second wavelength that differs from the first wavelength and a second chirp rate that differs from the first chirp rate.

8 Claims, 12 Drawing Sheets

(51) Int. Cl.
    *G01S 7/4912*    (2020.01)
    *G01S 17/34*    (2020.01)

(56)           References Cited

U.S. PATENT DOCUMENTS

| | | | |
|---|---|---|---|
| 9,310,471 | B2 | 4/2016 | Sayyah et al. |
| 2008/0304042 | A1* | 12/2008 | Ueno .................... G01S 7/4915 |
| | | | 356/28.5 |
| 2019/0064358 | A1 | 2/2019 | Desai et al. |
| 2019/0377135 | A1* | 12/2019 | Mansouri Rad ...... G01S 7/4811 |
| 2020/0363515 | A1* | 11/2020 | Luff .......................... G01S 7/34 |

FOREIGN PATENT DOCUMENTS

| | | | |
|---|---|---|---|
| JP | 2012-518793 | A | 8/2012 |
| JP | 2015-129646 | A | 7/2015 |
| JP | 2019-045574 | A | 3/2019 |

* cited by examiner (A) TIME WAVEFORM (μs)

(B) TOTAL FREQUENCY (C) SPECTRUM (A) TIME WAVEFORM (μs)

(B) TOTAL FREQUENCY FLUCTUATION (C) BEAT SIGNAL SPECTRUM (A) TIME WAVEFORM (μs)

(B) FREQUENCY TIME VARIATION   t (μs)          (C) FREQUENCY (M H z )

Lc=600m     T=1ms (A)R=100m                                    (B)R=300m (A) WITHOUT DELAY LINE                    (B) WITH DELAY LINE

DETERIORATION BY DIFFUSION OF LIGHT

TOTAL ~ 90dB

DETERIORATION BY OPTICAL CORRELATION

DelayLine  Ld=600m  Lc=600m  T=1ms

~30dB     TOTAL

DETERIORATION          DETERIORATION
BY OPTICAL             BY DIFFUSION
CORRELATION            OF LIGHT

DelayLine  Ld=600m Lc=600m T=1ms

DISTANCE AND SPEED MEASURING APPARATUS

TECHNICAL FIELD

The present invention relates to distance and velocity measurement apparatuses that are applicable, for example, to LiDAR and to sensors for robots.

BACKGROUND ART

An FMCW system is known as a technique applicable to LiDAR (Light Detection and Ranging, or Laser Imaging Detection and Ranging), which involves irradiating an object with laser light, receiving the laser light reflected therefrom and performing analysis to measure a distance to the object and a velocity of the object (refer for example to Patent Document 1).

The FMCW system is a method for obtaining the distance to and velocity of an object by temporally and linearly increasing and reducing a frequency of laser light (which is called chirping), irradiating the object with the laser light, subjecting the irradiation light and reflected light reflected from the object to coherent detection, generating a beat signal created by the difference between the two laser light frequencies, and subjecting the beat signal to frequency analysis.

The FMCW system realizes a preferable SN ratio (signal-to-noise ratio) compared to a ToF (Time of Flight) system in which distance is obtained based on time delay of pulses. Further, the FMCW system enables to measure the velocity of the object based on a Doppler shift of light.

PRIOR ART DOCUMENT

Patent Document

[Patent Document 1] Japanese Patent Application Laid-Open Publication No. 2001-324563
[Patent Document 2] Japanese Patent Application Laid-Open Publication No. 2015-129646
[Patent Document 3] U.S. Pat. No. 7,986,397
[Patent Document 4] Japanese Translation of PCT International Application Publication No. JP-T-2012-518793 (WO2010/141120)
[Patent Document 5] U.S. Pat. No. 9,310,471

DISCLOSURE OF THE INVENTION

Problems to be Solved by the Invention

However, the FMCW system taught in Patent Document 1 requires a laser with a good coherence having a long coherence length for ensuring accuracy that is generally expensive, which is a drawback since the cost of the apparatus is increased. Further, in order to measure the distance and the velocity accurately, it is necessary to perform accurate chirping of frequency of the laser light and to maintain an extremely strict linearity when increasing and decreasing the frequency.

Further, the velocity of the target is measured using a Doppler shift generated by the irradiation light and the reflected light, but during actual measurement, the measuring instrument or the target is often vibrating. When such vibration occurs, especially if the vibration is a high frequency vibration, there is a drawback in that measurement results are affected and the SN ratio is deteriorated.

Further, in a case where the distance and velocity measurement apparatus of the FMCW system is used for a LiDAR applied to automatic driving, for example, a large number of points must be measured with a wide angle, at a high speed, and with a high resolution. Furthermore, costs of such distance and velocity measurement apparatus must be suppressed to promote wide-spread use of the apparatus.

In order to realize the distance and velocity measurement apparatus adopting the FMCW system at a low cost, for example, a configuration taught in Patent Document 2 can be adopted. According to the apparatus taught in Patent Document 2, cost reduction of the apparatus is devised by irradiating a target with a laser light that has been intensity modulated by a periodic signal of a frequency smaller than a minimum value of a Doppler frequency measurable by motion of the target.

However, according to the configuration disclosed in Patent Document 2, there is a drawback in that if the velocity of the target is low, mixture of signals occurs by beat signals generated by the irradiation light and the reflected light, according to which the detection accuracy of distance and velocity is greatly deteriorated. Moreover, according to this configuration, modulation is mainly performed by sinusoidal waves to perform intensity modulation of LD (laser diodes), but the waveforms of the actual optical frequency may be disturbed during rising and falling of modulation due to the influence of temperature by injection current and the like, and the S/N ratio may be greatly deteriorated.

Furthermore, the frequency of the Doppler shift is proportional to the frequency of electromagnetic waves (such as light and millimetric waves) serving as the measurement target. Therefore, when measuring light, a great Doppler shift occurs by such a large optical frequency. For example, if a case is considered in which a LiDAR of a known FMCW system is applied to a vehicle moving at a velocity of about 100 km/h, a Doppler shift of approximately 73 Hz is generated by the light irradiated from the LiDAR and receiving light reflected from a stationary object. If the object is approaching, an even greater Doppler shift occurs.

A high-speed A/D converter is required to analyze the Doppler frequency of such a great Doppler shift, and the cost of the system becomes expensive. Furthermore, an object in an external environment (such as a car) is generally often vibrating, and it is rare that the object is strictly stationary. This vibration affects the Doppler shift and deteriorates the linearity of the chirped optical frequency of reflected light from the object, such that the S/N ratio is greatly deteriorated. Measures for improving this deterioration is not taught in the aforementioned patent documents.

A configuration disclosed in Patent Document 3 is known as a countermeasure against the deterioration of S/N ratio when analyzing the Doppler frequency. According to Patent Document 3, the system uses a tunable laser 501 and a single frequency laser 502, wherein one of the lasers, the tunable laser 501, is chirped while the other laser, the single frequency laser 502, is not chirped, and a reference light is shifted by an acousto-optic modulator (AOM), while square-law detection is performed by a camera 515 (refer to FIG. 5 and column 8, lines 35 to 44 etc. of Patent Document 3).

FIG. 6 of Patent Document 3 illustrates shapes of frequencies of the reflected light and the reference light in a case where the Doppler shift by vibration of the external environment does not exist. Meanwhile, FIG. 9 of Patent Document 3 illustrates waveforms of a case where the Doppler shift caused by vibration of the external environment exists. As illustrated in Patent Document 3, according to the disclosed method, the Doppler shift caused by the vibration of the external environment can be cancelled, and the deterioration of S/N ratio can be reduced. However, according to this method, the acousto-optic modulator (AOM) is expensive, and a camera is used, such that there is a drawback in that a wide-angle, high-speed image cannot be acquired.

According further to the prior art technique, there is known a LiDAR for generating a three-dimensional image of a measurement target, wherein two laser lights are used to perform frequency modulation by different chirp rates, and after multiplexing, the laser light is irradiated via a scanner to an external object (Patent Document 4).

However, according to the configuration disclosed in Patent Document 4, it is necessary to receive and analyze two beat signals (processing system in FIG. 1 and processor in FIG. 2 of the publication), and a high-speed AD converter and sampling processing is required, such that the apparatus becomes expensive. Further, the configuration disclosed in Patent Document 4 scans a measurement target with laser light, and it is assumed that a MEMS mirror is adopted.

A MEMS mirror scans laser light and the like by moving the mirror in an analog manner (refer for example to Patent Document 5). Such a MEMS mirror is effective in a ToF system of detecting time delay of pulses, since the mirror can be operated at a high speed of a few KHz. However, in the FMCW system, there is a drawback in that the S/N ratio is deteriorated by mirror movement, and deterioration of image occurs.

The present invention aims at providing a distance and velocity measurement apparatus mainly applicable to LiDAR, which enables to prevent deterioration of the S/N ratio even if the object in an external environment is vibrating. Another object of the present invention is to provide a distance and velocity measurement apparatus that does not include a moving part such as a MEMS mirror, and the S/N ratio is not deteriorated even when a low-cost laser is used. Furthermore, the present invention aims at providing a distance and velocity measurement apparatus capable of measuring a large number of points in a wide angle, at high speed, and with high resolution without deteriorating the image of the object even in the FMCW system.

Means of Solving the Problems

In order to solve the problems mentioned above, the present invention provides a measurement apparatus for measuring a distance to a target and a velocity of the target by a laser light, the apparatus including a first laser apparatus configured to irradiate a first laser light having a first wavelength and a first chirp rate; a second laser apparatus configured to irradiate a second laser light having a second wavelength of a wavelength that differs from the first wavelength and a second chirp rate of a chirp rate that differs from the first chirp rate; an irradiation-side multiplexer configured to subject the first laser light and the second laser light to multiplexing; a spectroscope configured to spectrally separate a laser light having been subjected to multiplexing by the irradiation-side multiplexer to an irradiation light to be irradiated to the target and a reference light serving as a reference for measurement; an irradiated light receiving device configured to irradiate the irradiation light to the target and receive a reflected light from the target; a light receiving-side multiplexer configured to subject the reflected light transmitted from the irradiated light receiving device and the reference light to multiplexing; a photodetector configured to convert a synthesized light having been subjected to multiplexing by the light receiving-side multiplexer to an electric signal; and a wave detector configured to perform detection of the conversion signal having been converted by the photodetector, wherein the wave detector is configured to detect the conversion signal to acquire a beat signal, and to analyze the distance to the target and the velocity of the target by subjecting the beat signal to frequency analysis.

According to the distance and velocity measurement apparatus of the present invention, the first laser apparatus and the second laser apparatus generate a first laser light and a second laser light having different frequencies and different chirp rates, which are multiplexed, and spectrally separated to an irradiation light and a reference light, wherein the irradiation light is reflected on the target and becomes a reflected light, and wherein the reflected light and the reference light are multiplexed. According further to the apparatus of the present invention, the multiplexed synthesized light is converted by the photodetector into an electric signal, the conversion signal is detected by the wave detector to acquire the beat signal, and the beat signal is subjected to frequency analysis to analyze the distance to the target and the velocity of the target.

By adopting the above-described configuration, even if the object in the external environment is vibrating, the deterioration of the SN ratio can be prevented. According to the above configuration, a relatively inexpensive laser such as a DFB laser that is generally used for generating laser can be adopted. Further, the present invention does not require a moving part such as a MEMS mirror.

According further to the distance and velocity measurement apparatus of the present invention, a difference between the first wavelength and the second wavelength is preferably 1 to 35 nm. If the difference between the two wavelengths is less than 1 nm, the sensitivity of the Doppler shift may be deteriorated during detection using the wave detector (refer to expression 15). Meanwhile, if the difference between the two wavelengths exceeds 35 nm, the frequency of the beat signal may become high, which may be inconvenient for analysis.

According further to the distance and velocity measurement apparatus of the present invention, a difference between the first chirp rate and the second chirp rate (AO) should preferably satisfy a following relationship [$\Delta\zeta \times 2R$ max/C<10 MHz (wherein C is a velocity of light in vacuum)], wherein R max represents a maximum distance for performing measurement.

According further to the distance and velocity measurement apparatus of the present invention, the photodetector is preferably a balanced photodetector. According to this configuration, the deterioration of the SN ratio during detection of light by the photodetector can be prevented.

According further to the distance and velocity measurement apparatus of the present invention, a delay line of a distance corresponding to a coherence length of the reference light or a maximum distance to be measured may be provided between the spectroscope and the light receiving-side multiplexer.

According further to the distance and velocity measurement apparatus of the present invention, an optical fiber used in the distance and velocity measurement apparatus is preferably a polarization-maintaining optical fiber, and a polarizing axis thereof is preferably made to correspond between members being connected. According to this configuration, drifting of signals by polarization rotation of the laser lights of the first laser light and the second laser light or fluctuation of status of the polarized light can be prevented, which contributes to improving the S/N ratio.

According further to the distance and velocity measurement apparatus of the present invention, the irradiated light receiving device can include a second spectroscope configured to spectrally separate the irradiation light into a plurality of lights, and a plurality of irradiation ports configured to irradiate the separated irradiation lights through a plurality of different irradiation surfaces, wherein refraction members having different irradiation angles may be attached to the plurality of irradiation ports.

According further to the distance and velocity measurement apparatus of the present invention, the irradiated light receiving device can include an irradiation port configured to irradiate the irradiation light from an irradiation surface, and a plurality of light receiving ports configured to receive the reflected light, wherein the light receiving ports are arranged around the irradiation port, wherein wo represents a radius of a light beam of the irradiation light, wherein wr represents a radius of a light beam of the reflected light, and wherein wr can be set to be double the value of wo or greater.

According further to the distance and velocity measurement apparatus of the present invention, at least a part of the first laser apparatus, the second laser apparatus, the irradiation-side multiplexer, the spectroscope, the light receiving-side multiplexer, the photodetector, and the wave detector can be integrated on a substrate. According to this configuration, reduction of manufacturing costs, downsizing of the apparatus, and facilitation of handling of the apparatus can be realized by integration.

MODE FOR CARRYING OUT THE INVENTION

Figure 1:
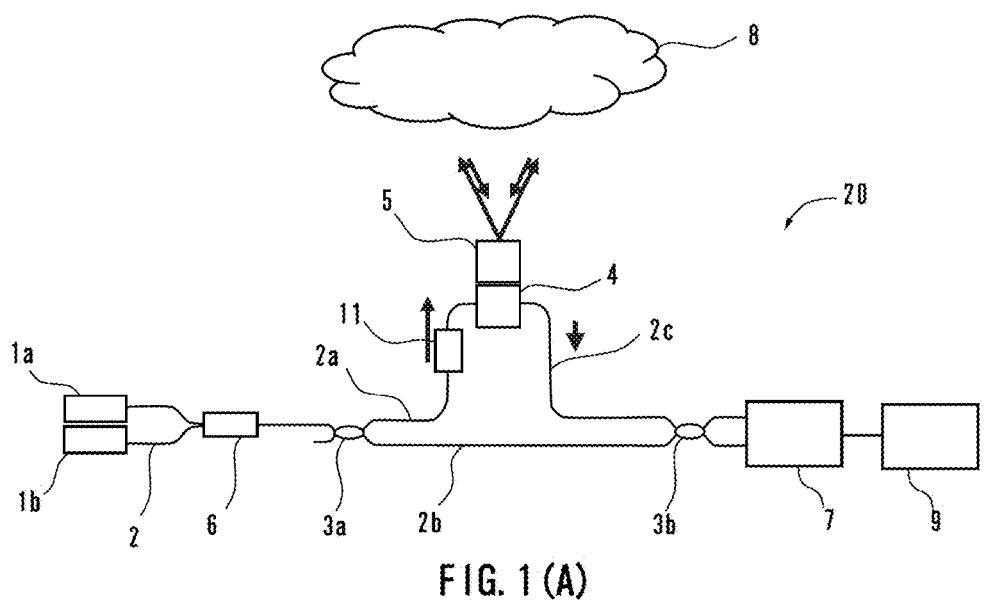
FIG. 1 is an explanatory view illustrating an apparatus configuration of LiDAR, which is an example of an embodiment of the present invention, wherein (A) is an explanatory view illustrating an apparatus configuration of LiDAR according to the present embodiment, and (B) is an explanatory view illustrating an apparatus configuration of LiDAR according to another embodiment.
Figure 1:
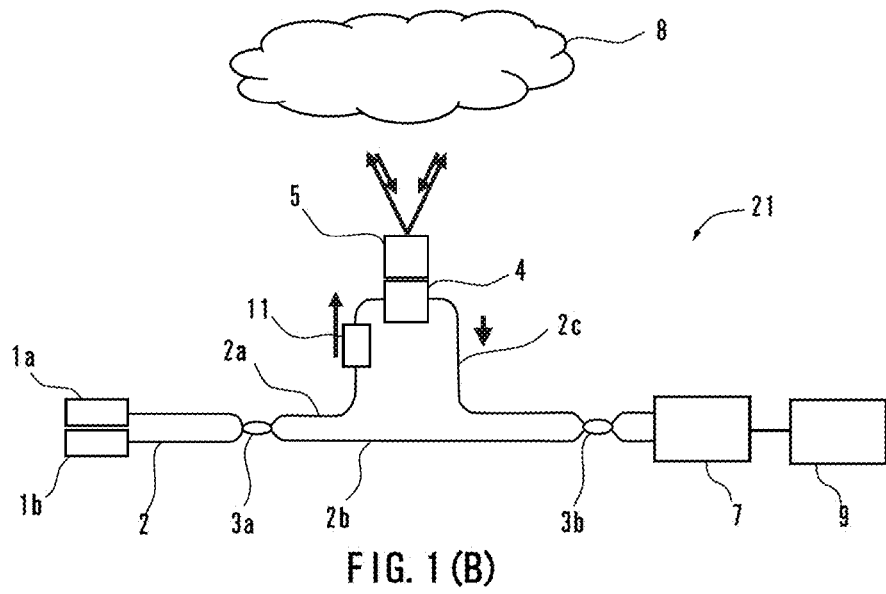

Next, a LiDAR (distance and velocity measurement apparatus) serving as an example of an embodiment of the present invention will be described with reference to FIGS. 1 to 16. FIG. 1(A) is an explanatory view illustrating an apparatus configuration of a LiDAR 20 according to the present embodiment.

As illustrated in FIG. 1(A), the LiDAR 20 according to the present embodiment is a measurement apparatus for measuring a distance to and a velocity of a target using laser light, and the measurement apparatus includes two laser apparatuses, which are a first laser apparatus $1a$ and a second laser apparatus $1b$. Further, these laser apparatuses and respective devices mentioned later are connected by an optical fiber 2.

The optical fiber 2 is a polarization-maintaining optical fiber, and in the LiDAR 20 of the present embodiment, the optical fiber is disposed such that a polarizing axis thereof is arranged in a same direction among components being connected. This arrangement enables to allow an optical scanner 5 (irradiated light receiving device) described later to perform a switching (scanning) operation using polarized light. If a polarization-maintaining type optical fiber 2 is not used, a polarization diversity configuration often used for optical communication can be adopted.

A device for generating a first laser light having a first wavelength and a first chirp rate arranged therein is connected to the first laser apparatus $1a$ (not shown in the drawing). Similarly, a device for generating a second laser light having a second wavelength whose wavelength differs from the first wavelength and a second chirp rate whose chirp rate differs from the first chirp rate is connected to the second laser apparatus $1b$.

In the present embodiment, the first wavelength is 1.55 μm, for example, and the first chirp rate is set to 20 MHz/μs. According further to the present embodiment, the second wavelength is 1.53 μm, for example, and the second chirp rate is set to 12 MHz/μs. In the embodiment, the difference between the first wavelength and the second wavelength is set to fall within the range of 1 to 35 nm.

A difference between the first chirp rate and the second chirp rate (AO) satisfies the following relationship, wherein R max represents a maximum distance for measurement.

$$\Delta\zeta \times 2R\ max/C < 10\ \text{MHz} \tag{1}$$

(wherein C represents a velocity of light in vacuum)

If a value on a left side of expression (1) is 10 MHz or greater, an inconvenience occurs in which an analog-digital converter or a sampling circuit becomes expensive.

Further, as illustrated in FIG. 1(A), the first laser apparatus 1a and the second laser apparatus 1b are connected via the optical fiber 2 to a WDM filter 6 (irradiation-side multiplexer), and an output side of the WDM filter 6 is coupled to an optical fiber coupler 3a. The WDM filter 6 operates as the irradiation-side multiplexer for multiplexing the first laser light and the second laser light generated by the first laser apparatus 1a and the second laser apparatus 1b.

The optical fiber coupler 3a according to the present embodiment is a spectroscope for spectrally separating the first laser light and the second laser light multiplexed by the WDM filter 6 into an irradiation light to be irradiated on an object 8 and a reference light serving as a reference for measurement. At an output side of the optical fiber coupler 3a, the irradiation light is branched to an irradiation port 2a and the reference light is branched to a local port 2b.

An optical amplifier 11 and an input/output unit 4 are connected to the irradiation port 2a. Further, an optical scanner 5 is connected to the input/output unit 4. A reflection port 2c to which the reflected light enters is connected downstream of the input/output unit 4.

The reflection port 2c and the local port 2b are connected to a second optical fiber coupler 3b (light receiving-side multiplexer). The internal configuration of the second optical fiber coupler 3b is the same as the optical fiber coupler 3a. An output side of the second optical fiber coupler 3b is connected to a balanced photodetector 7 (photodetector). Further, an output side of the balanced photodetector 7 is connected to a square-law detector 9 (wave detector).

The balanced photodetector 7 used in the present embodiment is also referred to as a balanced photodetector, and it is a device for converting synthesized light multiplexed by the second optical fiber coupler 3b serving as the light receiving-side multiplexer into electric signals. The balanced photodetector 7 is a type of photodetector, characterized in that it has a superior S/N ratio. According to the present embodiment, C12668, which is a product of Hamamatsu Photonics K.K., is used as the balanced photodetector 7.

Further, the square-law detector 9 is a device that performs detection of conversion signals that have been converted by the balanced photodetector 7. In the square-law detector 9, the conversion signals are detected to acquire a beat signal, and the beat signal is subjected to frequency analysis, by which the distance to the object 8 and the velocity (relative velocity) thereof are analyzed.

Figure 12:
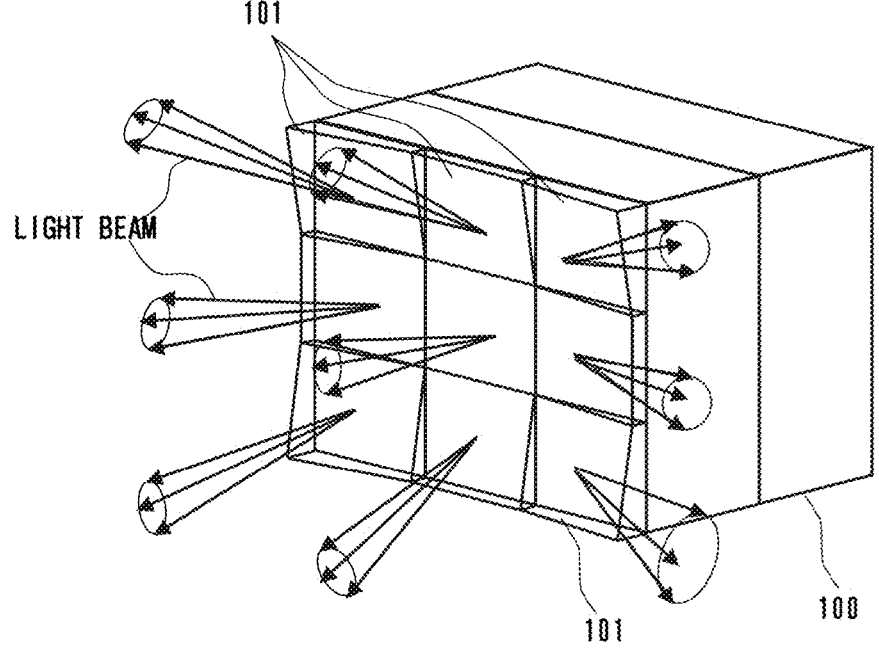
FIG. 12 is an explanatory view illustrating a state in which a multi-scanner is used as an optical scanner.
Figure 13:
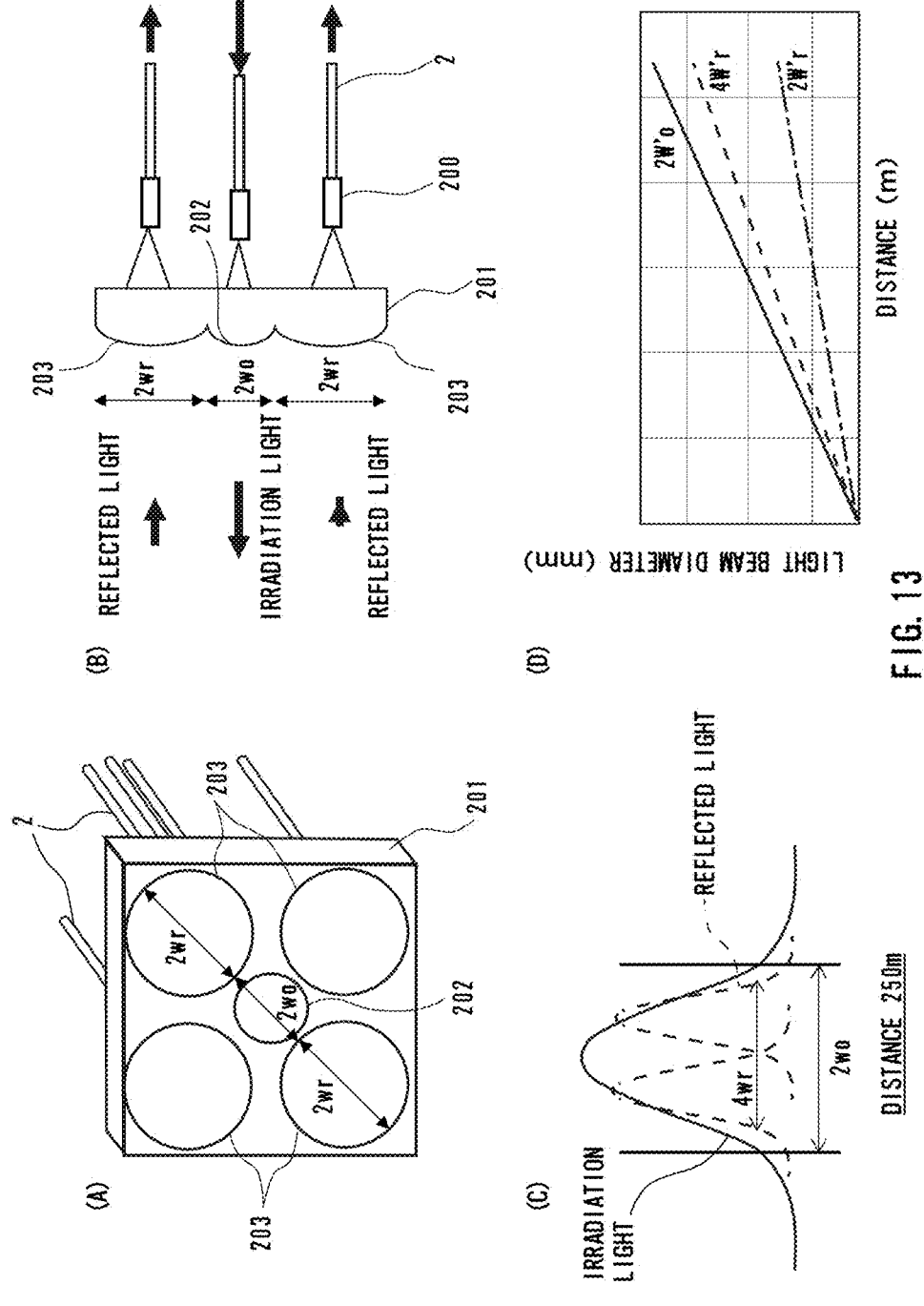
FIGS. 13 (A) to (D) are explanatory views illustrating an example of an input/output unit 4.

In the present embodiment, a device having a same configuration as a switching engine disclosed in FIG. 12 of the PCT application filed by the present inventor etc. is adopted as the optical scanner 5 (refer to the Publication of WO2019/004295). In the present embodiment, a wedge-shaped prism 101 having various angles on a surface thereof is additionally attached thereto (refer to FIG. 12). The wedge-shaped prism 101 is a refraction member having different irradiation angles such that irradiation angles of multiple light beams vary, wherein the surface of the wedge-shaped prism 101 serves as an irradiation surface and an irradiation port.

FIG. 1(B) illustrates a LiDAR 21 according to another embodiment of the present invention. Since the transmission frequency of the laser being used is in close proximity, a wavelength dependency of branching ratio of the polarization-maintaining type optical fiber coupler 3a can be ignored. Therefore, the WDM filter 6 illustrated in FIG. 1(A) is not used, and the polarization-maintaining type optical fiber coupler 3a is used as the irradiation-side multiplexer and spectroscope. According to the LiDAR of the present invention, either of the configurations illustrated in FIGS. 1(A) and 1(B) can be adopted.

The LiDAR 20 according to the present embodiment adopts the above-mentioned configuration, and a first laser and a second laser generated by the first laser apparatus 1a and the second laser apparatus 1b are transmitted via the following paths.

The first laser and the second laser are multiplexed by the WDM filter 6, and the multiplexed laser light is transmitted to the optical fiber coupler 3a and split into the irradiation light and the reference light. The irradiation light is transmitted though the irradiation port 2a, amplified by the optical amplifier 11, and irradiated via the input/output unit 4 and the optical scanner 5 toward the object 8 serving as the target in the external environment. The irradiation light irradiated to the object 8 is reflected on the surface of the object 8, passed through the optical scanner 5 and the input/output unit 4 as reflected light, and enters the reflection port 2c.

The reflected light transmitted through the reflection port 2c is multiplexed with the reference light transmitted through the local port 2b by the second optical fiber coupler 3b. The synthesized light multiplexed by the second optical fiber coupler 3b is converted into electrical signals by the balanced photodetector 7.

The synthesized light multiplexed by the second optical fiber coupler 3b is composed of the reflected light of the first laser light and the second laser light and the reference light of the first laser light and the second laser light, such that two optical beat signals in proximity are generated. The optical beat signals are received by the balanced photodetector 7 and converted into two RF (Radio Frequency) beat signals in proximity.

Thereafter, the RF beat signals are converted by the square-law detector 9 into electric signals of a difference between the two RF beat signals. These electric signals are of low speed compared to the optical beat signals, such that a low-cost ADC (Analog-digital converter) can be used.

Now, the reason for adopting the optical scanner taught in WO2019/004295 to the present embodiment will be described. One type of optical scanners deflects light beams in an analog manner, such as a resonance-mode MEMS mirror, and another type of optical scanners performs digital switching, such as the optical scanner 5 according to the present embodiment. According to the method in which the MEMS mirror adopted in the prior art technique is used in the resonance mode, the light beam is deflected in an analog manner, such that the irradiated light is constantly moving.

According to the ToF system in which pulses are irradiated, the pulse width is a few n seconds, such that the moving distance during that time is ignorable. For example, in the case where the pulse width is 5 n seconds, the FoV (Field of View) is 60 degrees, and the resonance mode is 1

KHz, the movement is approximately 3 mm at a distance of 300 m, such that the influence of mirror movement, if any, can be substantially ignored.

However, according to the FMCW system, in order to detect the object in a time of a few μs to a few thousand μs, the moving distance will be a few m to a few hundred m, according to which the acquisition of images becomes difficult depending on the mirror movement. Meanwhile, according to the device disclosed in the above-mentioned publication in which the switching is performed digitally, the device is stopped at a fixed position, such that distortion of the image will not occur. Therefore, the present embodiment adopts the optical scanner 5 for switching the laser beams digitally.

Next, the flow of signal processing will be described in detail.

The flow of signal processing will be described with reference to FIGS. 1(A), 1(B), 2(A), and 2(B). The lights from the first laser apparatus 1*a* and the second laser apparatus 1*b* having been subjected to frequency modulation by linear chirping are given by the following expressions.

$$Ea=Aa\ \text{expi}(\omega at+\zeta at^2/2) \tag{2}$$

$$Eb=Ab\ \text{expi}(\omega bt+\zeta bt^2/2) \tag{3}$$

Wherein, $\omega i$ (i is a orb, the same applies hereafter) represents a frequency of light, and $\zeta i$ represents a chip rate (inclination of optical frequency), which is given by the following expression.

$$\zeta i=Bi/T \tag{4}$$

Figure 2:
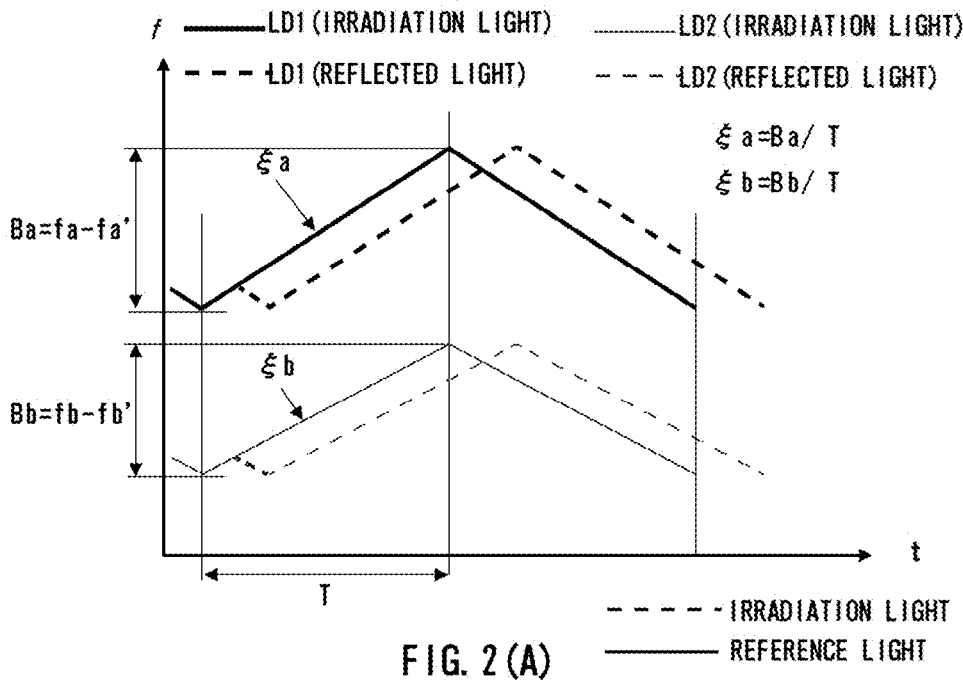
FIG. 2 is an explanatory view illustrating a relationship between frequency of light from a first laser apparatus $1a$ and a second laser apparatus $1b$ having been subjected to frequency modulation by linear chirping and time, wherein (A) illustrates a state without a Doppler shift, and (B) illustrates a state in which the Doppler shift by vibration of the external environment exists.
Figure 2:
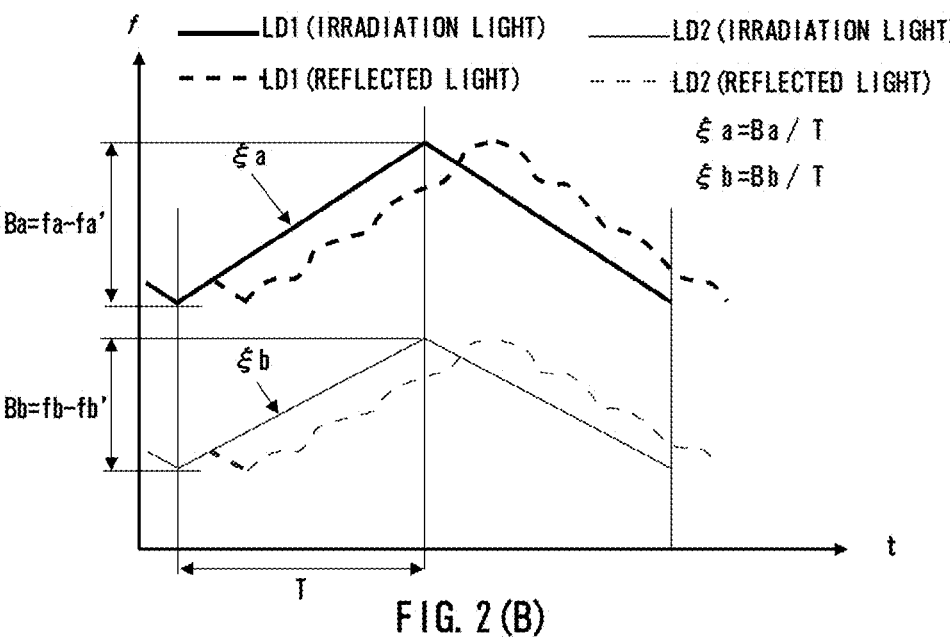

Wherein, Bi represents an amount of frequency shift illustrated in FIG. 2, and T represents a chirp time.

The light reflected on the object 8, passed through the input/output unit 4, and entering the optical scanner 5 is given by the following expressions.

$$Ea'=\eta^{1/2}Aa\ i\ \exp\{\omega a(t-\tau)+\zeta a(t-\tau)^2/2+\varphi a(t)\} \tag{5}$$

$$Eb'=\eta^{1/2}Ab\ i\ \exp\{\omega b(t-\tau)+\zeta b(t-\tau)^2/2+\varphi b(t)\} \tag{6}$$

Wherein, $\tau$ represents a delay time by reciprocation of light reflected on the object 8 and returning, and when the distance to the object 8 is denoted by R, the delay time is given by the following expression.

$$\tau=2R/C \tag{7}$$

Wherein, R represents a distance to the object, C represents a velocity of light, and $\eta$ represents an attenuation factor of light power.

These four lights are combined by the second optical fiber coupler 3*b* and received by the balanced photodetector 7. The lights from the two different apparatuses, which are the first laser apparatus 1*a* and the second laser apparatus 1*b*, have no correlation and do not interfere with each other. The frequency difference thereof is approximately a few tens of GHz or greater, such that it cannot be tracked by the low-speed balanced photodetector 7. Therefore, a current i (t) having a DC component finally removed is given by the following expression.

$$i(t)=ia(t)+ib(t) \tag{8}$$

$$i_i(t)=\text{rect}(t/T-\tfrac{1}{2})\eta^{1/2}\cos\theta i \tag{9}$$

$$\theta i=\omega i\tau+\zeta i\tau t+\zeta i\tau^2/2+\varphi i(t) \tag{10}$$

In expression (10), $\omega i\tau$ (i is a orb) represents a phase term of constant, and based on expression (7), $\zeta i\tau^2/2$ can be ignored since the velocity of light C is great. Therefore, the important phase term $\theta$ is the following expression.

$$\theta i=\zeta i\tau t+\varphi i(t) \tag{11}$$

By subjecting the phase of expression (11) to time differentiation, a frequency fi (i is a or b) can be obtained.

$$2\pi f_1=d\theta i(t)/dt=\zeta i\tau+d\varphi i(t)/dt \tag{12}$$

On the right side of expression (12), a first term $\zeta i\tau$ represents a beat frequency that varies according to distance, and a second term dφi (t)/dt represents a frequency change by velocity and vibration of the object 8 or a frequency change by speckle. For example, the phase change by velocity and vibration of the object 8 is given by the Doppler shift as shown by the following expression.

$$2\pi fdpi=d\varphi i(t)/dt=2\pi/\lambda i\cdot(2dR/dt)=2\pi(2\upsilon)/\lambda i) \tag{13}$$

Wherein, fdpi (i is a or b) represents a Doppler frequency, $\lambda i$ represents a transmission wavelength of laser, and v represents a velocity of the object. If the velocity of the object is fixed, the Doppler frequency is also fixed, but if the velocity v of the object changes with time, the Doppler frequency also changes with time.

One example thereof is illustrated in FIG. 2(B). Compared to FIG. 2(A), the frequency variation by Doppler frequency is superposed on the reflected light. This frequency variation deteriorates the SN ratio significantly.

Figure 3:
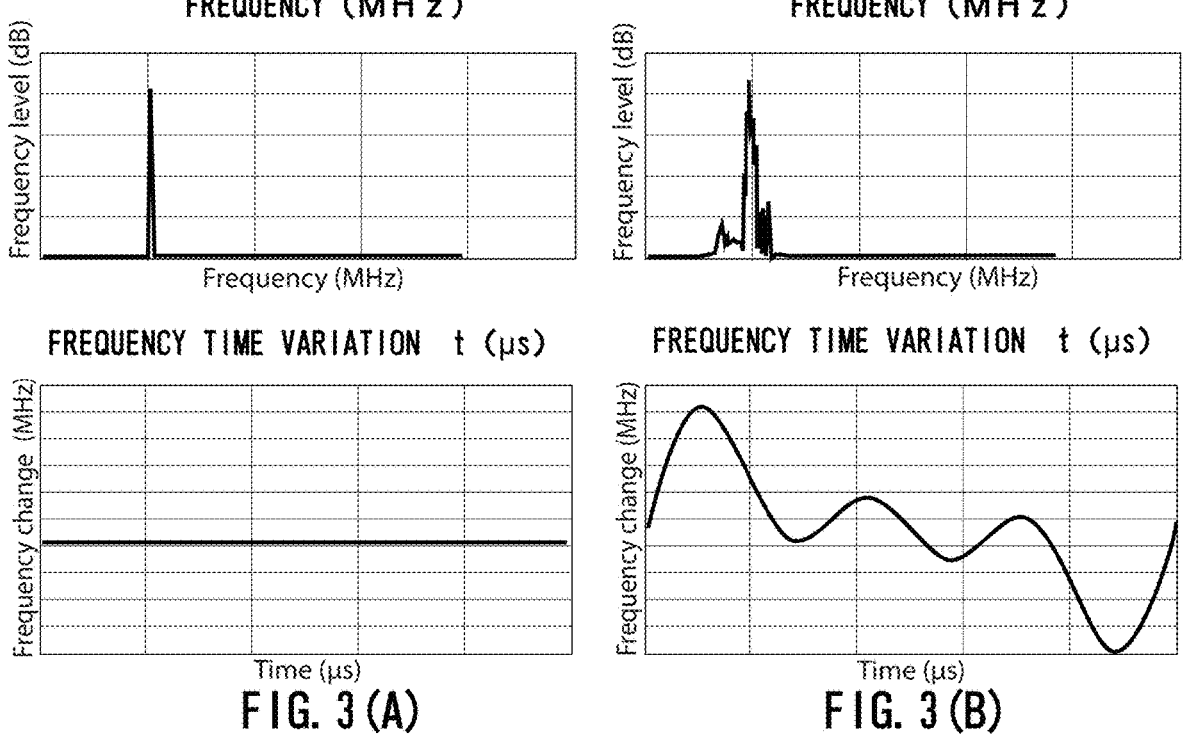
FIG. 3 is an explanatory view illustrating a spectrum of a result of frequency analysis of an optical beat signal, wherein (A) illustrates a state in which the spectrum is fixed without any Doppler frequency fluctuation, and (B) illustrates a state in which the Doppler frequency fluctuation is superposed.

FIG. 3 illustrates a spectrum of a result of frequency analysis of a light beam signal of (A) a case where there is no fluctuation of Doppler frequency and the Doppler frequency is fixed, and (B) a case where the Doppler frequency fluctuation has been superposed. In the example, a vibration in which the object has an amplitude of approximately 0.03 μm to approximately 0.01 μm at 10 KHz, 20 KHz, and 30 KHz is superposed.

If there is no fluctuation, the optical beat signal has a single spectrum and has a superior S/N ratio, whereas if fluctuation exists, the optical beat signal is expanded and the S/N ratio is deteriorated. As described, in such a high frequency, a slight displacement of vibration causes deterioration of the S/N ratio.

In order to avoid such deterioration, the i (t) obtained in expression (8) is further subjected to square-law detection.

$$i^2(t)=\text{rect}(t/T-\tfrac{1}{2})\eta\sigma(\theta a,\theta b) \tag{14}$$

$$\sigma(\theta a,\theta b)=1+\tfrac{1}{2}\{\cos 2\theta a+\cos 2\theta b+2(\cos \theta a+\cos \theta b)\}+\cos(\theta a-\theta b) \tag{15}$$

Wherein, regarding $\theta a$ and $\theta b$ denoted in expression (11), by approximating the chirp rate $\zeta i$ and the wavelength $\lambda i$, they can be controlled to a substantially equivalent magnitude, and the second term in brackets $\{$ and$\}$ has a frequency that is double the approximately equivalent beat frequencies fa≈fb. Meanwhile, the last term is important, and it is the beat signal that is finally detected. References $\theta a$ and $\theta b$ have substantially equivalent magnitude phases, such that the beat frequencies thereof are shifted toward the low frequency.

Figure 4:
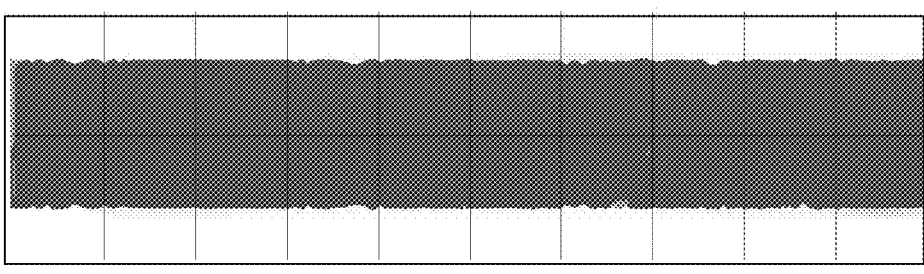
FIG. 4 is an explanatory view of a current signal of a first laser apparatus illustrating (A) a time waveform, (B) a total frequency including distance and Doppler shift (fixed and fluctuated), and (C) a spectrum waveform thereof.
Figure 4:
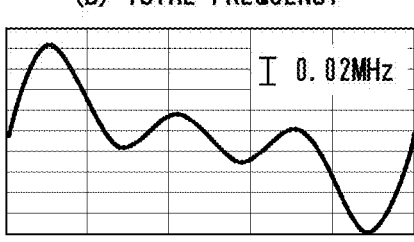
Figure 4:
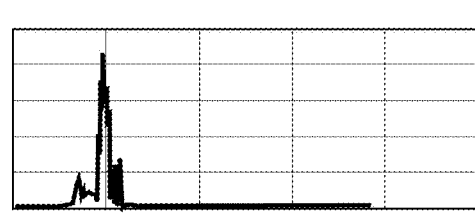

Hereafter, the actual example thereof will be illustrated. FIG. 4 illustrates one wavelength only, that is, a signal of current is (t) which is the first term of expression (8). FIG. 4(A) illustrates a waveform, FIG. 4(B) illustrates a total frequency including the distance and the Doppler shift (fixed and fluctuated), and FIG. 4(C) illustrates a spectrum waveform of a case where the wavelength of the one first laser apparatus 1*a* is 1.55 μm and the chirp rate is 20 MHz/μs.

Figure 5:
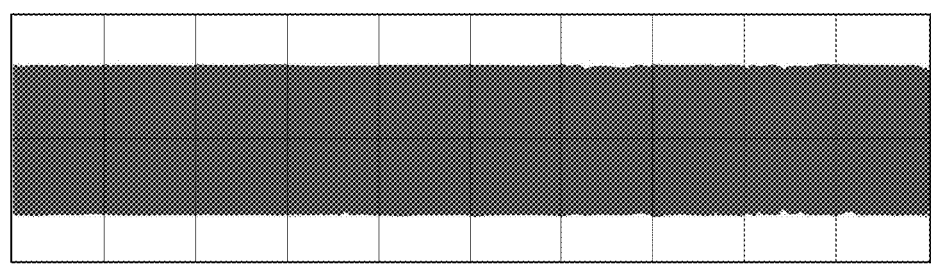
FIG. 5 is an explanatory view of a current signal of a second laser apparatus illustrating (A) a time waveform, (B) a total frequency including distance and Doppler shift (fixed and fluctuated), and (C) a spectrum waveform thereof.
Figure 5:
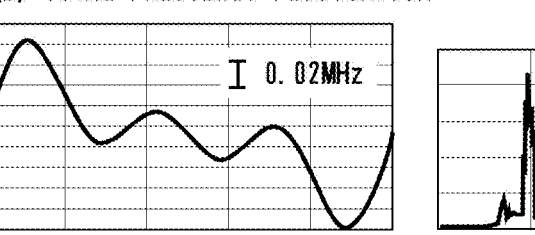
Figure 5:
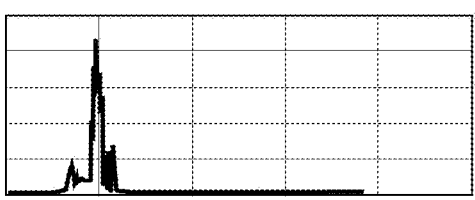

Similarly, FIG. 5 shows a signal of current ib (t) of the other, second laser apparatus 1*b*, wherein FIG. 5(A) illustrates a time waveform, FIG. 5(B) illustrates a total frequency including the distance and the Doppler shift (fixed and fluctuated), and FIG. 5(C) illustrates a spectrum waveform of a case where the wavelength is 1.495 μm and the chirp rate is 12 MHz/μs. FIGS. 4 and 5 have similar waveforms, but the peaks of the spectrum are slightly different. Both spectra are expanded by fluctuation of the Doppler shift.

Figure 6:
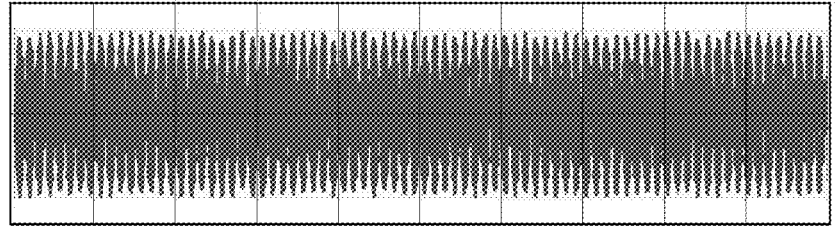
FIG. 6 is an explanatory view of the waveforms illustrated in FIGS. 4 and 5 illustrating (A) a time waveform, (B) a total frequency including distance and Doppler shift (fixed and fluctuated), and (C) a spectrum waveform of a synthesized waveform thereof.
Figure 6:
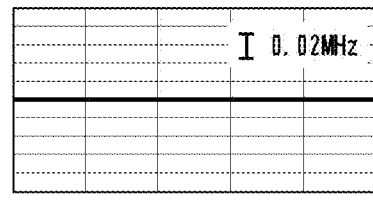
Figure 6:
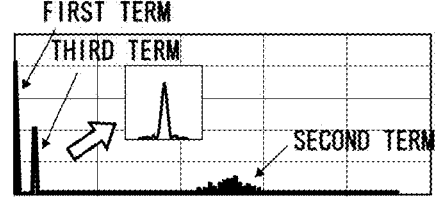

FIG. 6 illustrates a signal of expression (14) having combined these two waveforms, wherein FIG. 6(A) illustrates a time waveform, FIG. 6(B) illustrates a time variation of total frequency including the distance and the Doppler shift (fixed and fluctuated), and FIG. 6(C) illustrates a spectrum waveform thereof. In the spectrum waveform, the beat frequencies of the first term, the second term, and the third term of expression (15) are illustrated in the drawing. In the time waveform, the beat signals generated by the frequency difference between the current is (t) and the current ib (t) shown by the third term of expression (15) are shown.

Further, the fluctuation range of the Doppler shift by the beat frequency on the low frequency side of the third term is cancelled to a substantially ignorable level and is fixed, and the spectrum on the low frequency side after square-law detection is not expanded, which shows an extremely ideal line spectrum, and shows no deterioration of the S/N ratio.

The spectrum frequency fb on the low frequency side after square-law detection indicated in the third term of expression (15) is given by the following expression.

$$fb = 1/2\pi[\Delta\zeta\tau + d(\Delta\phi)/dt]$$

$$= \Delta\zeta\tau/2\pi + 2v\Delta\lambda/\lambda^2$$

$$= \Delta\zeta\tau/2\pi + fdp$$

(16)

Wherein, $\Delta\zeta$ and $\Delta\lambda$ are given by the following expressions.

$$\Delta\zeta = \zeta a - \zeta b$$ (17)

$$\Delta\lambda = \lambda a - \lambda b$$ (18)

The first term of expression (16) represents a beat signal according to the distance, and the second term represents a beat signal according to the Doppler shift. According to expression (17) and expression (18), the chirp rate and the wavelength in proximity can be used to down-convert the total beat signals to a low frequency, according to which inexpensive AD converter and sampling signal processing are realized.

Figure 7:
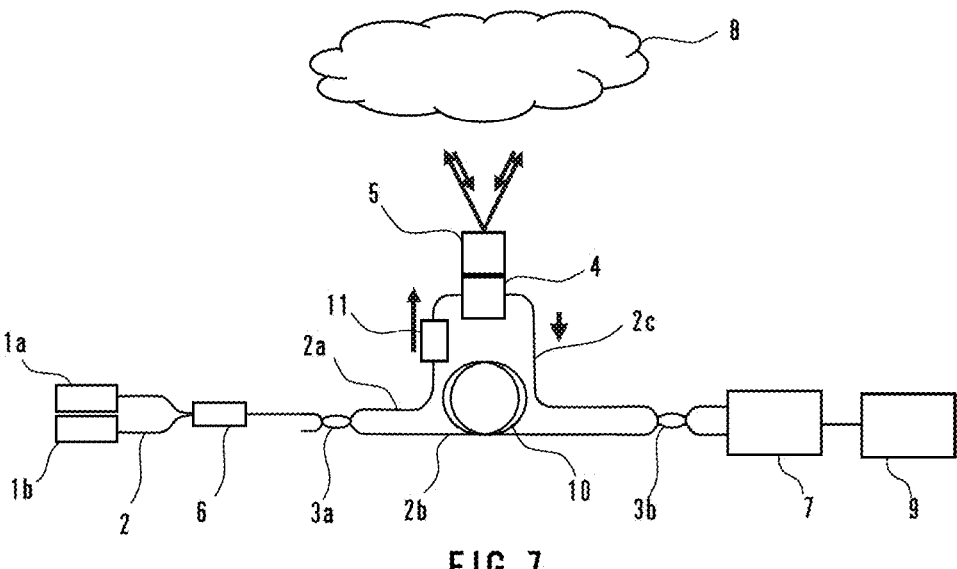
FIG. 7 is an explanatory view illustrating a state in which a delay line composed of a polarization-maintaining optical fiber is added to a local port according to the configuration of FIG. 1.

The frequency according to the distance and the Doppler shift frequency can be isolated by carrying out the above-described signal processing in two regions, the up-chirp region (frequency rising toward the right) and the down-chirp region (frequency lowering toward the right) in FIG. 2(B). In order to realize this processing, as illustrated in FIG. 7, a delay line 10 composed of a polarization-maintaining optical fiber is added to the local port 2b. A length L of the delay line 10 is set as in the following expression, wherein R max represents a distance corresponding to a maximum measurement distance set as target.

$$Ld \text{ to} 2R \text{ max}/Neff$$ (19)

Wherein, Neff represents an equivalent refractive index of PMF (Polarization Maintaining Fiber).

Figure 8:
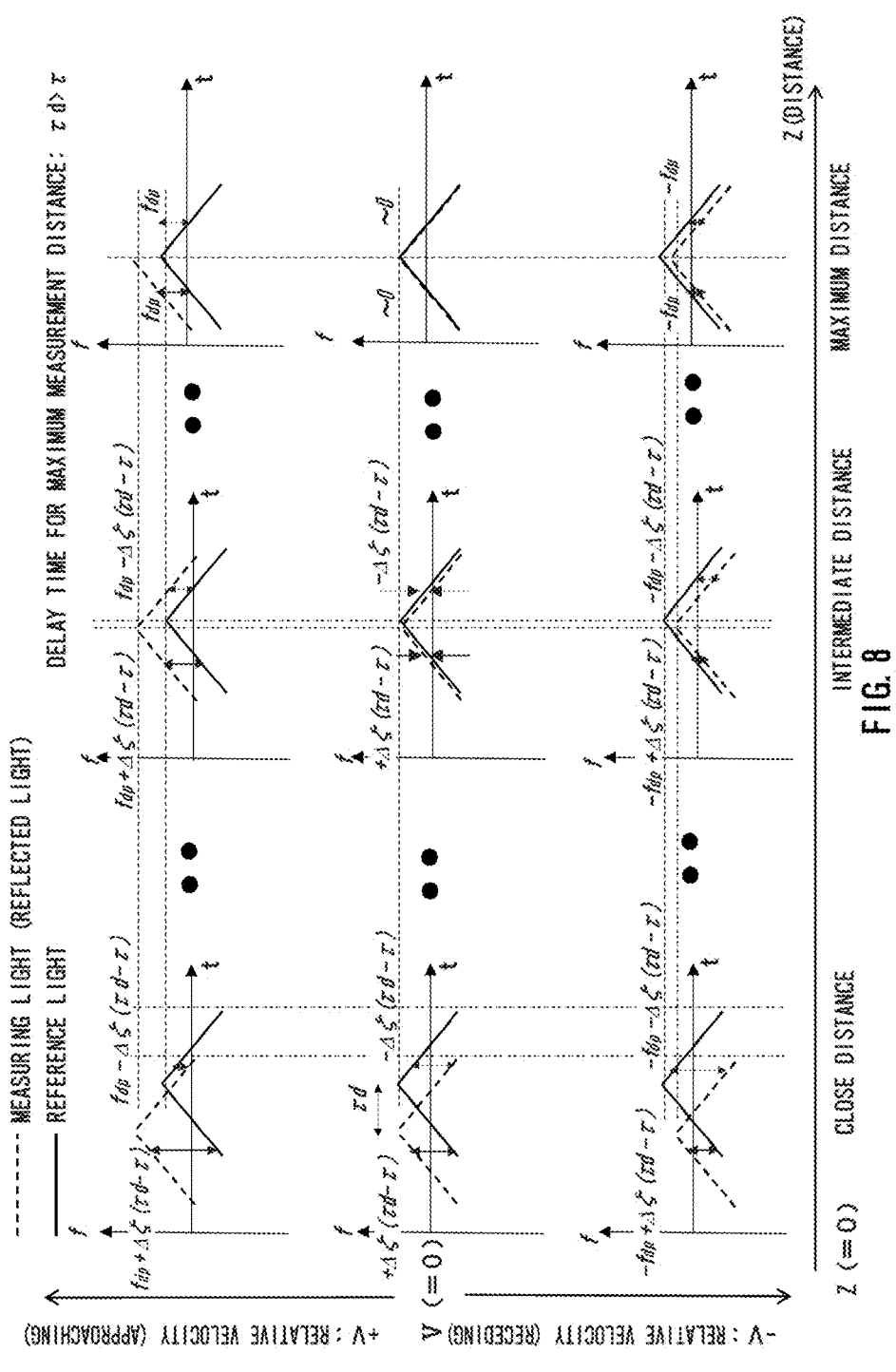
FIG. 8 is an explanatory view illustrating up-chirp and down-chirp waveforms (time variation of frequency shifts) in a state where the delay line is added to the apparatus.

Thereby, not only can the beat signal according to the distance and the beat signal according to the Doppler shift be isolated, but also the direction of relative velocity (whether it is approaching or receding) can be detected. The reason thereof will be described below. FIG. 8 illustrates up-chirp and down-chirp waveforms (time variations of frequency shift) in a case where the delay line 10 is added.

The horizontal axis represents distance to each object 8 (where the distance is close, intermediate, and of maximum distance), and the vertical axis represents relative velocity of the object 8 and the LiDAR 20 according to the present embodiment (where + indicates approaching, and − indicates receding). In the present embodiment, the delay line 10 of a maximum measurement distance is added, such that the up-chirp and down-chirp waveform (solid line) of the reference light is sifted toward the right side. Further, the measuring light (reflected light) is also shifted toward the right side according to the distance. The following expression always holds for the distance of the measurement area.

$$\tau d > \tau$$ (20)

Wherein, τd represents a delay time by the delay line 10, which is given by the following expression.

$$\tau d = Ld/C$$ (21)

As can be recognized from FIG. 8, in a state where the relative velocity of the LiDAR 20 according to the present embodiment and the object 8 is positive (when approaching), the up-chirp and down-chirp waveform of the reflected light is shifted upward, whereas in a state where the relative velocity is negative (when receding), the up-chirp and down-chirp waveform of the reflected light shifts downward.

Therefore, the beat frequencies of the reflected light and the reference light for up-chirp and down-chirp are given by the following expressions.

In a state where the relative velocity is positive:

$$\text{Up-chirp beat frequency: } fup = +fdp + \Delta\zeta(\tau d - \tau)$$ (22a)

$$\text{Down-chirp beat frequency: } fdown = +fdp - \Delta\zeta(\tau d - \tau)$$ (22b)

In a state where the relative velocity is negative:

$$\text{Up-chirp beat frequency: } fup = -fdp + \Delta\zeta(\tau d - \tau)$$ (22c)

$$\text{Down-chirp beat frequency: } fdown = -fdp - \Delta\zeta(\tau d - \tau)$$ (22d)

Further, based on FIG. 8, the following information can be obtained in a measurement range closer than the maximum distance.

$$(1) \text{ When } fup > fdown: \text{ relative velocity is positive,}$$
$$fdp = \tfrac{1}{2}(fup + fdown)$$ (23a)

$$(2) \text{ When } fup < fdown: \text{ relative velocity is negative,}$$
$$fdp = -\tfrac{1}{2}(fup + fdown)$$ (23b)

$$(3) \text{ Beat frequency according to distance: } \Delta\zeta(\tau d - \tau)$$
$$= \tfrac{1}{2}(fup - fdown)$$ (23c)

Based on the above, relative velocity υ and distance R can be derived from the following expressions.

$$\upsilon = \lambda a \lambda b / \{8\pi(\lambda a - \lambda b)(fup + fdown)\}$$ (24)

$$R = Ld - C(fup - fdown)/4\Delta\zeta$$ (25)

Meanwhile, according to another embodiment, the length L of the delay line 10 is set to satisfy the following expression.

$$L \text{ to } 2Lc/Neff$$ (26)

Wherein, Lc represents a coherence length.

Whether which of the lengths is set as the length of the delay line 10 is determined based on the specification of the LiDAR system.

Figure 9:
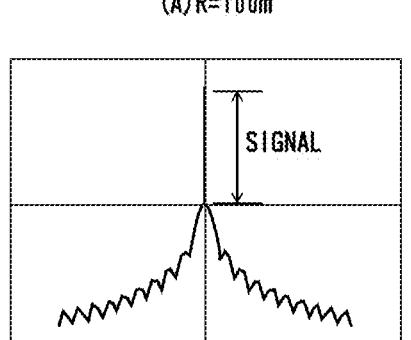
FIG. 9 is an explanatory view illustrating an optical spectrum of a state where the measurement distance is (A) 100 m and (B) 300 m.
Figure 9:
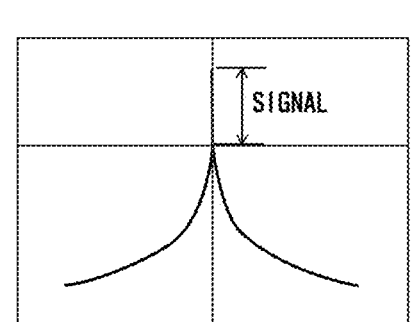

Now, a case in which the length L of the delay line is set to the coherence length Lc will be described. FIG. 9 of the embodiment illustrates a spectrum of an optical signal of a case where the delay line 10 is not added. FIG. 9 illustrates an optical spectrum of a state where the measurement distance is (A) 100 m and where the distance is (B) 300 m.

In FIG. 9, a spectrum of the FMCW signal and a phase noise of laser as noise are illustrated. The measurement time is 1 mm/sec. As illustrated, when the distance increases, optical correlation is lost due to time delay $\tau$ and the signal component is deteriorated. In the present embodiment, the signal power is deteriorated from 30 dB in the case of 100 m to 20 dB in the case of 300 m.

Figure 10:
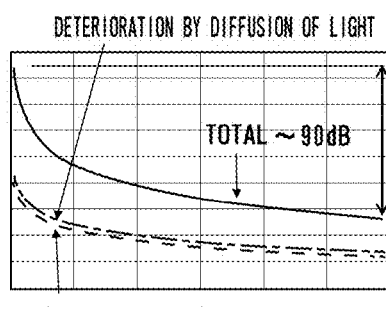
FIG. 10 is an explanatory view illustrating a change of signal component with respect to measurement distance of cases with and without the delay line, wherein (A) illustrates the state without the delay line, and (B) illustrates the state with the delay line.
Figure 10:
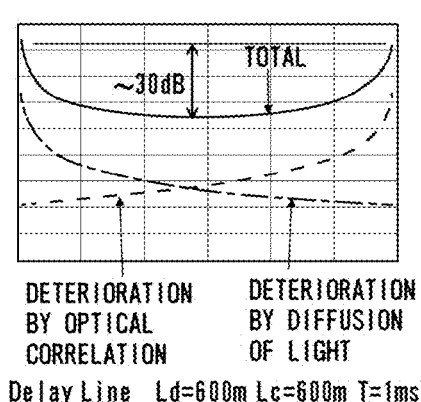

FIG. 10 illustrates a change of a signal component with respect to the measurement distance with and without a delay line. As illustrated in FIG. 10(A), when the measurement distance increases, the optical correlation is lost, and the signal component is reduced. The attenuation factor is attenuated by a square of the distance. Further, the light irradiated from the LiDAR is collimated and therefore not easily affected by distance, but the light power after being reflected on the object 8 is diffused approximately by a square of distance R.

Since a part of this reflected light is received at the opening of the optical scanner 5, the received light power is also attenuated approximately by a square of the distance. Therefore, in a case without the delay line 10, the optical signal component is attenuated by a third or a fourth power of the distance considering a heterodyne detection of light, and the optical signal is deteriorated sharply with respect to the distance. In the present embodiment, a signal component deterioration of 90 dB or greater occurs.

Meanwhile, as illustrated in FIG. 10(B), when a delay line exists, the attenuation by diffusion of light is small at a distance close to the LiDAR, but by adding the delay line 10, the optical correlation is deteriorated and the signal component is reduced. In contrast, at a distance far from the LiDAR, the attenuation by diffusion of light is great, but the optical correlation is good since the delay line 10 is added.

Accordingly, in a case where the delay line 10 is provided, the deterioration of signal component is suppressed to a low value from a close distance to a far distance (R max), and it is approximately fixed. According to the present embodiment, the penalty is suppressed by a signal component deterioration of approximately 30 dB. Based on the above description, by adding the delay line 10, the SN ratio can be improved by 60 dB or more compared to the case where the delay line is not added.

Figure 11:
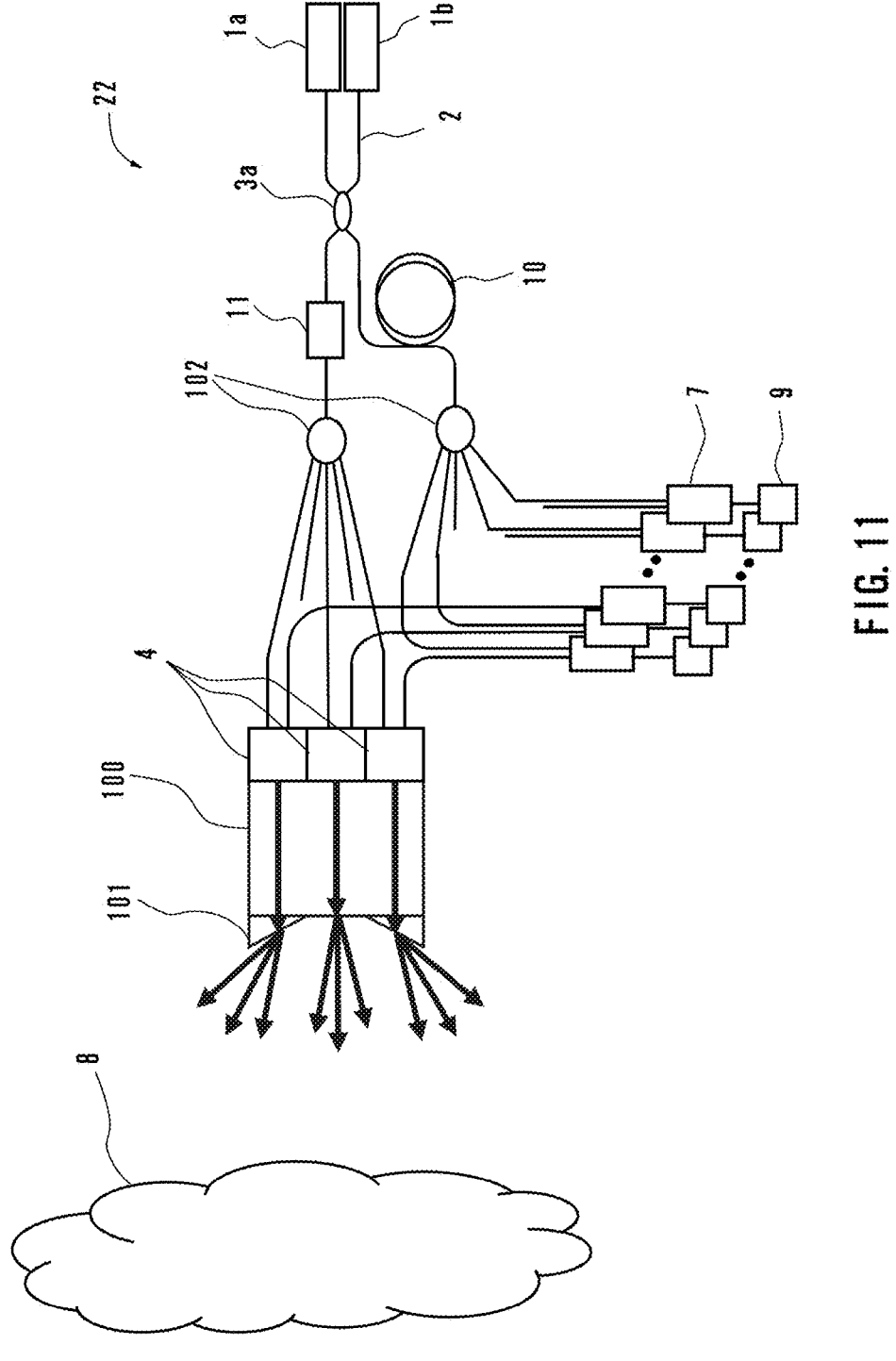
FIG. 11 is an explanatory view illustrating a LiDAR according to another embodiment.

FIG. 11 is an explanatory view illustrating a LiDAR 22 according to another embodiment. In the embodiment, a multi-scanner 100 (FIG. 12) is used as an optical scanner to scan light in a wide angle and at high speed. In the present embodiment, the irradiation light according to the aforementioned embodiment is split by an 1:N optical splitter 102, and thereafter, each split light is connected to the input/output unit 4.

Meanwhile, the reflected light from the object 8 is passed through the multi-scanner 100, passed through the input/output unit 4, received by each of the balanced photodetectors 7, and detected by each of the square-law detectors 9. According to this configuration, many balanced photodetectors 7 and square-law detectors 9 are used, and the number of AD converters are accordingly increased, such that the present technique is extremely effective in reducing the cost of the system.

An example of a configuration of the multi-scanner 100 is illustrated in FIG. 12. A scanner having a same configuration as a switching engine illustrated in FIG. 12 of the PCT application filed by the present inventor etc. is adopted as the multi-scanner 100 (refer to the publication of WO2019/004295). In the present embodiment, a wedge-shaped prism 101 having various angles is additionally arranged on the surface thereof.

In the present embodiment, nine wedge-shaped prisms 101 are arranged on the multi-scanner 100. By coupling nine input/output units 4 to the wedge-shaped prisms 101 and appropriately selecting the angles of the respective wedge-shaped prisms 101, different scenes on a front side thereof can be scanned independently, and a LiDAR having a wide FoV, of high speed, and with high resolution with only a small influence of the joints between the respective scans is realized.

FIGS. 13(A) to 13(D) are explanatory views illustrating an example of the input/output unit 4. An optical circulator can be used as the input/output unit 4, according to which a single pixel is acquired by a single scan. Meanwhile, according to the input/output unit 4 of the present embodiment, four pixels can be obtained by a single scan.

As illustrated in FIG. 13(B), the input/output unit 4 according to the present embodiment is composed of an integrated lens 201 in which five lenses composed of two types of lenses having different curvatures are integrated, independent lenses 200, and polarization-maintaining type optical fibers 2. According to the present embodiment, the integrated lens 201 includes one lens 202 (irradiation port) having a small curvature radius, and four lenses 203 (light receiving ports) having a large curvature radius.

As illustrated in FIG. 13(A), since the curvature radius of the lens 202 at the center of the integrated lens 201 is small, the irradiated light is a light having a small beam dimension (beam radius wo), and it is used as the irradiation light. Meanwhile, four lenses having a greater curvature radius than the lens 202 are arranged around the lens 202, which is used for receiving the reflected light.

The operation thereof will be described below. The light emitted from a polarization-maintaining optical fiber 2 at the center is collimated by the lens 200 and the lens 202 and irradiated as the irradiation light to the object. Meanwhile, the reflected light having been reflected on the object is received by the lenses 203 and further passed through the lens 200 to enter the polarization-maintaining optical fiber 2. The lenses 203 and the lens 200 are arranged with a slight offset $\Delta x$. This arrangement is adjusted such that two, upper and lower, light beams are positioned at appropriate distances on the object (in the present embodiment, two light beams are arranged such that foots of the light beams are overlapped). If the light is emitted from the polarization-maintaining optical fiber 2 for receiving light and the light is reversed (light is made to proceed in the reverse direction), the irradiation light and the light proceeded in the reverse direction must overlap on the object, as illustrated in FIG. 13(C), due to the reciprocal property of light. If they are not overlapped, the reflected light from the object cannot be received. Therefore, a beam size wo of the irradiation light and a beam size wr of the reflected light (the beam size wr of the light proceeding in the reverse direction) are required to satisfy the following condition.

$$wr \geq 2wo \qquad (27)$$

Below, the reason for setting the beam size wr to be equal to or greater than twice the beam size wo will be described. The light emitted from the polarization-maintaining optical fiber 2 is subjected to Gaussian distribution, and the light follows the propagation of a Gaussian beam. The collimated light is expanded by diffraction along with the propagation, and a spread angle α (half angle) is inversely proportional to the beam size at the time of collimation, as shown in the following expression.

$$\alpha = \lambda / w\pi \qquad (28)$$

Wherein, λ represents wavelength, and w represents beam size.

Therefore, the irradiation light of a small beam diameter (beam radius wo) has a large beam size (W'o) on a far object, and in contrast, the reflected light (light proceeding in the reverse direction) has a large beam diameter (beam radius wr), such that it has a large beam size (W'r) on a far object.

The light beam size at distance R is given by 2αR. Therefore, in order for the irradiation light and the two reflected lights to overlap on a far object, a condition of 2W'r<W'o must be satisfied, such that expression (27) is obtained.

FIG. 13(C) illustrates one example thereof, wherein the relationship between distance and beam size in a case where wo=2 mm and wr=5 mm is illustrated. It can be recognized that at a far location, the irradiation light includes the reflected light. The illustrated example shows waves where four ports are provided to receive the reflected light, but the technique can be expanded to a larger number of ports, such as five or six.

Figure 14:
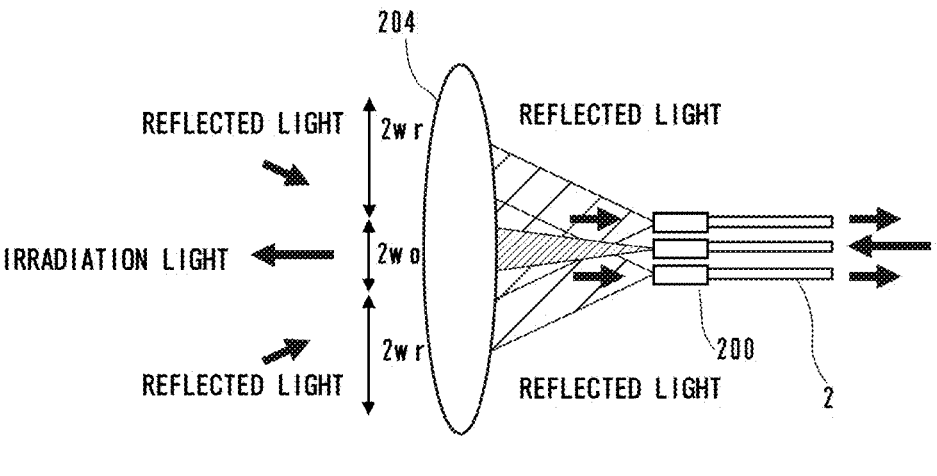
FIG. 14 is an explanatory view illustrating another embodiment of the input/output unit 4.

FIG. 14 is an explanatory view illustrating another embodiment of the input/output unit 4. In the present embodiment, one lens 204 is used, the lens 200 for irradiation light and the polarization-maintaining optical fiber 2 is arranged at the center of the lens 204, and the lens 200 for receiving reflected light and the polarization-maintaining optical fiber 2 are arranged on an upper and lower area thereof. In the example, a different lens is used as the lens 200 for irradiating light and the lens 200 for receiving light, and the beam size is adjusted such that a reflected light similar to the embodiment illustrated in FIG. 13 can be received as a result.

Figure 15:
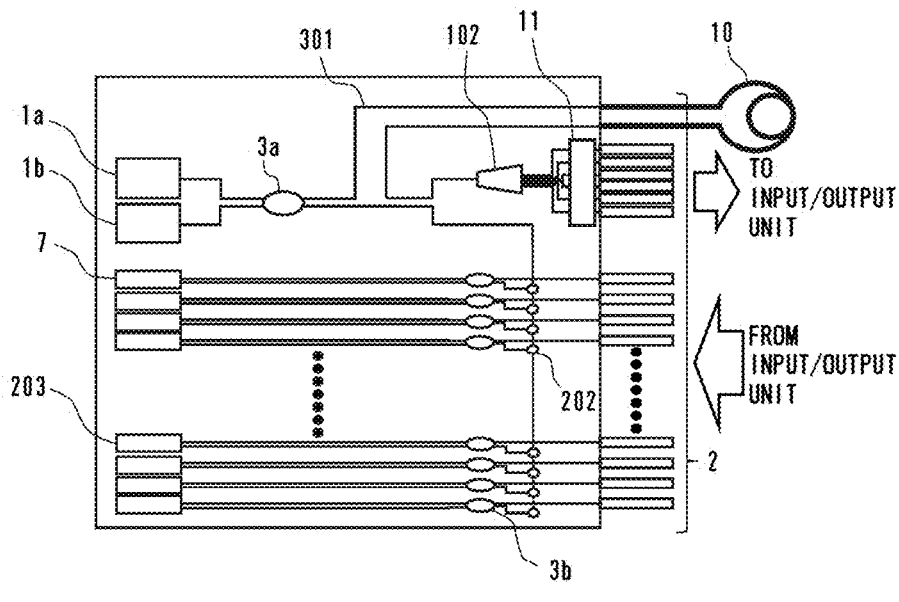
FIG. 15 is an explanatory view illustrating an embodiment in which optical function components are formed as a single chip.

FIG. 15 is an embodiment in which optical function components according to the embodiment of FIG. 11 are formed as one chip. According to the embodiment, the first laser apparatus 1a, the second laser apparatus 1b, the polarization-maintaining type optical fiber coupler 3a, the 1:N optical splitter 102 (second spectroscope), the balanced photodetector 7, an optical tap, and the optical amplifier 11 (which in the present example is SOA: Semiconductor Optical Amplifier) are hybrid-integrated on a silicon substrate. The polarization-maintaining type optical fiber coupler 3a, the 1:N optical splitter 102 and the optical tap are realized by patterning a silicon waveguide 301, whereas the first laser apparatus 1a, the second laser apparatus 1b, the optical amplifier 11, and the balanced photodetector 7 are formed of different materials, such that these elements and the silicon waveguide are subjected to highly efficient optical coupling.

Further, the silicon waveguide and the optical fiber 2 are coupled at a right-side end face of the chip. A configuration is adopted in which an output end of the silicon waveguide is subjected to mode magnification such that the spot sizes of the silicon waveguide and polarization-maintaining optical fiber correspond as much as possible. Further, a coil of the optical fiber 2 is coupled to an upper part as the delay line

10. The main axes of the optical fibers 2 are made to correspond to main axes of the silicon waveguide 301 (which are parallel and perpendicular to the substrate).

Figure 16:
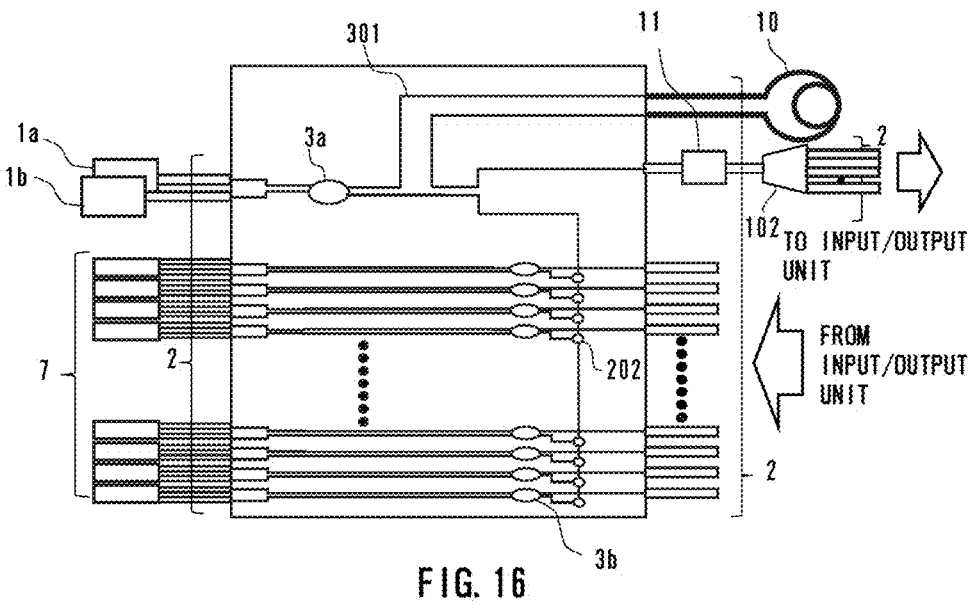
FIG. 16 is an explanatory view illustrating an embodiment in which a main part of the optical function components is formed as a single chip.

FIG. 16 illustrates an embodiment in which a part of the optical function components according to the embodiment of FIG. 11 is formed as a chip. In the example, the first laser apparatus 1a, the second laser apparatus 1b, the optical amplifier 11 (here, EDFA: Erbium Doped Fiber Amplifier, is used), and the balanced photodetector 7 which are made of different materials are external components, which are coupled using the optical fiber 2. The coupling is performed such that the polarizing axes of the respective elements and the main axes of the optical fibers 2 correspond.

As described, according to the embodiments illustrated in FIGS. 15 and 16, downsizing and cost reduction are enabled by integrating a large number of function elements.

In the above-illustrated embodiments, the distance and velocity measurement apparatus according to the present embodiment is applied to a LiDAR, but the present technique is not limited thereto, and it can be applied to other sensors such as for a robot. Further, the square-law detector 9 for performing square-law detection is used as the wave detector according to the above embodiment, but wave detection is not limited thereto, and an envelope detector (not shown) for performing envelope demodulation can be adopted. Further, other detection methods that are generally used can also be adopted.

DESCRIPTION OF THE REFERENCE NUMERAL

1a: first laser apparatus
1b: second laser apparatus
2: optical fiber
3a: optical fiber coupler
3b: second optical fiber coupler
4: input/output unit
5: optical scanner
6: WDM filter
7: balanced photodetector (photodetector)
8: object
9: square-law detector (wave detector)
10: delay line
11: optical amplifier
20, 21, 22: LiDAR
100: multi-scanner
101: wedge-shaped prism
102: 1:N optical splitter
200: lens
201: integrated lens
202 to 204: lens
301: silicon waveguide

The invention claimed is:

1. A distance and velocity measurement apparatus for measuring a distance to a target and a velocity of the target by a laser light, the apparatus comprising:

a first laser apparatus configured to irradiate a first laser light having a first wavelength and a first chirp rate;

a second laser apparatus configured to irradiate a second laser light having a second wavelength of a wavelength that differs from the first wavelength and a second chirp rate of a chirp rate that differs from the first chirp rate;

an irradiation-side multiplexer configured to subject the first laser light and the second laser light to multiplexing;

a optical splitter configured to spectrally separate a laser light having been subjected to multiplexing by the irradiation-side multiplexer to an irradiation light to be irradiated to the target and a reference light serving as a reference for measurement;

an irradiated light receiving device configured to irradiate the irradiation light to the target and receive a reflected light from the target;

a light receiving-side multiplexer configured to subject the reflected light transmitted from the irradiated light receiving device and the reference light to multiplexing;

a photodetector configured to convert a synthesized light having been subjected to multiplexing by the light receiving-side multiplexer to an electric signal; and a wave detector configured to perform detection of the conversion signal having been converted by the photodetector, wherein the wave detector is configured to detect the conversion signal to acquire a beat signal, and to analyze the distance to the target and the velocity of the target by subjecting the beat signal to frequency analysis, and wherein a difference between the first chirp rate and the second chirp rate (AZ) satisfies a following relationship:

$\Delta\zeta \times 2Rmax/C < 10$ MHz (wherein C is a velocity of light in vacuum), wherein Rmax represents a maximum distance for performing measurement.

2. The distance and velocity measurement apparatus according to claim 1, wherein a difference between the first wavelength and the second wavelength is 1 to 35 nm.

3. The distance and velocity measurement apparatus according to claim 1, wherein the photodetector is a balanced photodetector.

4. The distance and velocity measurement apparatus according to claim 1, wherein a delay line of a distance corresponding to a coherence length of the reference light or a maximum distance to be measured is provided between the optical splitter and the light receiving-side multiplexer.

5. The distance and velocity measurement apparatus according to claim 1, wherein an optical fiber used in the distance and velocity measurement apparatus is a polarization-maintaining optical fiber, and a polarizing axis thereof is made to correspond between members being connected.

6. The distance and velocity measurement apparatus according to claim 1, wherein the irradiated light receiving device comprises a second optical splitter configured to spectrally separate the irradiation light into a plurality of lights, and a plurality of irradiation ports configured to irradiate the separated irradiation lights through a plurality of different irradiation surfaces, and wherein refraction members having different irradiation angles are attached to the plurality of irradiation ports.

7. The distance and velocity measurement apparatus according to claim 1, wherein the irradiated light receiving device comprises an irradiation port configured to irradiate the irradiation light from an irradiation surface, and a plurality of light receiving ports configured to receive the reflected light, wherein the light receiving ports are arranged around the irradiation port, wherein wo represents a radius of a light beam of the irradiation light, wherein wr represents a radius of a light beam of the reflected light, and wherein wr is set to be double the value of wo or greater.

8. The distance and velocity measurement apparatus according to claim 1, wherein at least a part of the first laser apparatus, the second laser apparatus, the irradiation-side multiplexer, the optical splitter, the light receiving-side multiplexer, the photodetector, and the wave detector is integrated on a substrate.

* * * * *